Nov. 14, 1967

P. G. CLITES 3,352,991

METHOD AND APPARATUS FOR MELTING METALS BY INDUCTION HEATING

Filed March 9, 1965

INVENTOR.
PHILIP GORDON CLITES
BY
ATTORNEY

Nov. 14, 1967

P. G. CLITES 3,352,991

METHOD AND APPARATUS FOR MELTING
METALS BY INDUCTION HEATING

Filed March 3, 1965

INVENTOR.
PHILIP GORDON CLITES
BY
ATTORNEY

United States Patent Office 3,352,991
Patented Nov. 14, 1967

3,352,991
METHOD AND APPARATUS FOR MELTING METALS BY INDUCTION HEATING
Philip Gordon Clites, Silverton, Oreg., assignor to the United States of America as represented by the United States Atomic Energy Commission
Filed Mar. 9, 1965, Ser. No. 438,435
9 Claims. (Cl. 219—10.79)

ABSTRACT OF THE DISCLOSURE

An inductive heating apparatus in a controlled atmosphere chamber with a solenoidal work coil having radio-frequency power source disposed around a conductive sleeve containing a longitudinal slit and including a constricted medial portion for a concentrating flux field from the work coil, a cold crucible mold means defined adjacent to the concentrated flux field and a means for feeding a conductive material to be melted into the mold.

---

This invention arose out of, or under, a contract with the United States Atomic Energy Commission.

The invention relates, generally, to the processing of metals at temperatures above the melting point and, more particularly, to methods and apparatus for processing metals at temperatures above the melting point utilizing electrical induction heating.

Metals of a wide variety including highly-reactive refractory metals which react significantly with crucible materials have, in recent years, been melted in consumable electrode arc furnaces or electron-beam furnaces equipped with water-cooled copper crucibles. Such crucibles eliminate contaminant sources which exist when refractory crucibles are used at high temperatures to melt reactive metals. Induction melting potentially offers the advantages of a controlled melting rate and melting at very low vacuum pressures characteristic of electron-beam melting. In addition, induction melting provides a means of melting in regions with a wide range of vacuum pressures in contrast to the very stringent operating vacuum requirements of electron-beam melting equipment. Control and power supply circuitry is less complicated and materially less expensive for equivalent power ratings and through-put capability. Consumable electrode arc furnaces require substantial gas pressures to permit stable arc operation and, accordingly, cannot operate in low vacuum pressure regimes required with certain metals and which are characteristic of electron-beam melting techniques. Moreover, in consumable electrode arc furnaces, the power input and the attendant rate of heat application must be held within relatively rigid limits set by arc stability considerations wherefor heating rates above or below those set by the capricious nature of arc operation cannot be used.

Attempts have heretofore been made to melt metals in solid copper crucibles utilizing induction heating. However, it has been found very difficult if not impossible to induce the necessary eddy currents in metals contained in such crucibles since, almost universally, such a procedure merely establishes excessive eddy currents in the crucible itself with consequent wastage of the heating power. Efforts to mitigate the foregoing effect have resorted to the use of split copper crucibles. As long ago as 1926, Siemens used such devices but the lack of success discouraged interest for many years. Interest has been renewed in recent years by the work of G. H. Schippereit et al., at Battelle Memorial Institute, as reported in an article entitled "Cold-Crucible Induction Melting of Reactive Metals," J. of Metals, February 1961, pp. 140–143.

In this work the metal contained in the split crucible caused problems in that molten metal shorted out the segments of the crucible, in effect, yielding a solid crucible. The heat developed by this method of induction heating is at the surface of the ingot which is also the area from which heat is removed by the cooling water and therefore heating energy is used inefficiently. Also, the metal shorting across the gap in the crucible wall produces numerous minor arcs powered by the induced eddy currents and these melt and release crucible material contaminants into the ingot melt.

Inductive heating drip melting techniques have been used, for example, in the early days of zirconium melting, by Magel et al., as reported in USAEC Report No. 3320, entitled "Inductive Melting of Reactive Metals Without Refractory Containers." This procedure yielded ingots with rough sidewalls. Another procedure in which pancake coils were used to melt the tops of ingots resulted in frequent shorting of the coils by the formation of metal deposits thereon. A further method of inductive heating is that reported by Okress et al., "Metals Melted Without Crucibles," Iron Age, vol. 170, July 12, 1952, pp. 83–86, in which the molten metal is "levitated" by combined electric and magnetic fields and is therefore not in contact with any crucible. This procedure is beset by spattering problems, is suitable only for small quantities and cannot produce an ingot. The various prior art procedures described above may be seen to possess sundry undesirable characteristics and limitations which preclude reliable casting of high-purity ingots and the conduct of other melting operations on a substantial and economical scale.

The present invention provides inductive melting apparatus and methods of operation utilizing a novel arrangement of an elongated tubular sleeve having a constricted central portion and split longitudinally serving as a flux concentrator or intensifier and defining a crucible or mold portion formed integrally therewith in which a variety of metal melting and forming operations are effected. With this arrangement a molten pool of metal is formed in a concentrated and relatively sharply defined heating zone out of contact with the gap in the flux concentrator or any equivalent gap wherefor the difficulties experienced with prior art split crucible arrangements do not arise herein. More particularly, the molten pool is formed and supported in the concentrated heating zone by solidified material formed by molten material which contacts the crucible portion of the concentrator or intensifier in such a way that there is always at least a thin layer of solidified material between the molten material and the crucible wall. This effect is somewhat similar to that utilized in conventional consumable electrode electric arc processes using water cooled copper crucibles. The basic arrangement described above is quite effective in that the inductive heating flux field is substantially concentrated and localized in the molten pool while the supporting cooled region is somewhat below the heating zone and eddy current losses therein are minimized. Crucible portions are similarly located remotely from the heating zone and little heating loss occurs therein. The basic arrangement described in the foregoing is amenable to modification to provide for either batch or for continuous operation in which a suitable particulate form of the material to be processed is added incrementally or a rod or wire form is introduced incrementally or continuously to be drip melted and the solidified or cast material is withdrawn at a comparable rate. Moreover, the foregoing operations can be conducted in selected atmospheres and/or under any gas or vacuum pressure condition required or appropriate for a wide variety of metal processing and treating operations.

Accordingly it is an object of the invention to provide improved methods and apparatus for the inductive melting of metals.

Another object of the invention is to provide methods and apparatus in which electrically conductive materials are melted by electrical inductive heating without contamination.

Still another object of the invention is to provide methods and apparatus wherein inductive heating is employable to effect the melting of electrically conductive materials under a wide variety of gas pressure or vacuum conditions.

A further object of the invention is to provide apparatus and methods wherein electrically conductive materials including metals and alloys are melted by inductive heating and solidified to provide physically sound cast forms of uncontaminated materials.

A still further object of the invention is to provide methods and apparatus wherein metals and the like are molten in a concentrated inductive heating zone while supported upon solidified melt material.

One other object of the invention is to provide induction heating arrangements in which conductive materials are melted in a concentrated heating zone while supported by cooled solidified material and in which the rate of heating can be closely controlled under a wide variety of controlled atmosphere and/or gas pressure or vacuum conditions.

Still another object of the invention is to provide methods and apparatus wherein a metal or other electrically-conductive composition can be added continuously to be drip melted by induction heating and continuously cast to provide ingot forms of the composition.

Other objects and advantageous features of the invention will become apparent by consideration of the following description taken in conjunction with the accompanying drawing of which:

Apparatus in accordance with the invention will include basically, solenoidal work coil means adapted to be powered by a radiofrequency power source somewhat as in conventional induction heating practice. As an essential feature of the invention a flux concentrator in the form of an elongated generally cylindrical sleeve is positioned within the work coil, to provide a localized heating zone centrally therein. Means are provided for introducing material to be melted into said localized heating zone and a cooled crucible or mold portion formed integrally with said concentrator is provided in a location appropriate to receive the molten material. More particularly, the cooled mold portion is located closely adjacent to said concentrated heating to receive and solidify a layer of molten material which layer in turn serves to support a molten pool of material in the concentrated heating zone while the integral crucible is itself substantially outside of and not particularly subject to heating by the concentrated inductive heating flux. The basic structure described in the foregoing is subject to modification and disposition in an enclosure provided with means for evacuation and/or providing a controlled atmosphere as described more fully hereinafter.

Figure 1:
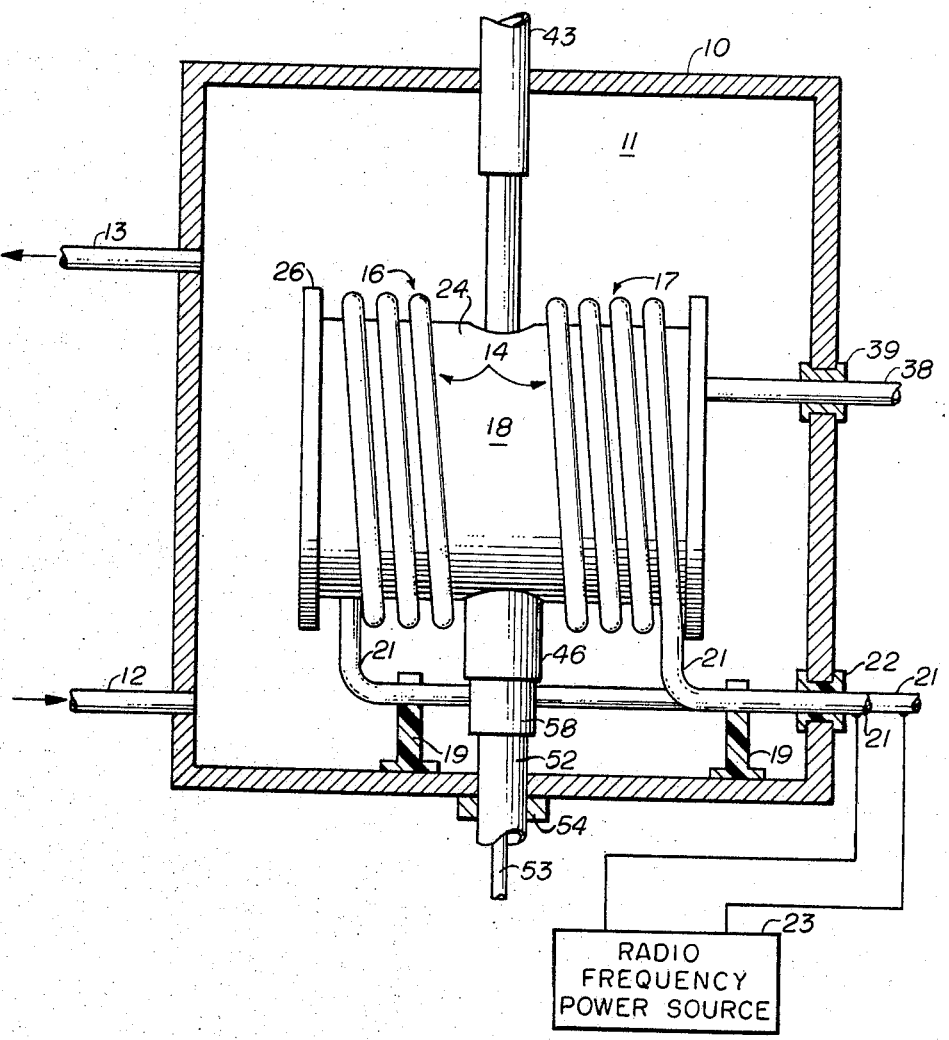
FIGURE 1 is an elevational view of an induction melting and casting apparatus in accordance with the invention as mounted in an enclosure partly broken away to better illustrate details and is approximately in proportionately scaled dimensions.

A preferred embodiment of the apparatus of the invention as illustrated in FIGURE 1 is disposed in a housing 10 defining a chamber 11 provided with conduit means 12 for connection to a gas supply system (not shown) for introducing inert gases such as helium or argon or reactive gases such as air, nitrogen or the like in the event a reaction with the molten material is desired. Conduit means 13 may also be provided for coupling to vacuum pump means (not shown) to permit evacuation of chamber 11.

The chamber may also be provided with access ports (not shown) and remote manipulatory appliances to effect various manipulations. It is often convenient to use a glass cross fitting provided with metal flange covers as the chamber and with the means described hereinafter arranged thereon.

An inductive heating work coil 14 generally including two axially aligned similar helical sections 16, 17 of uniform pitch with a medial region 18 of separation is preferably supported with the axis thereof substantially horizontal as by means of standoff insulators 19. Terminal leads 21 are lead exteriorly of housing 10 as by means of hermetically sealed insulating feedthrough bushings 22 for connection to a radiofrequency power source 23 of conventional design. For high-power inputs it will be appreciated that the leads 21 and coil 14 may be constructed of copper tubing provided with water cooling as in conventional practice.

Figure 3:
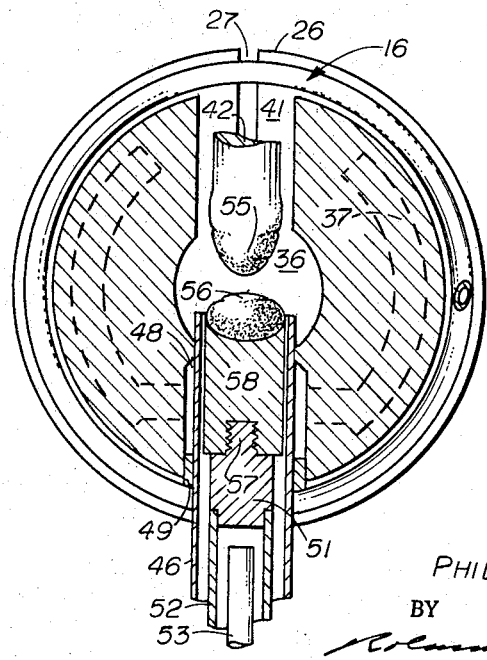
FIGURE 3 is a transverse cross sectional view taken along the plane 3—3 of FIGURE 2.

Of significant importance an intensifier or flux concentrator constructed as an elongated cylindrical sleeve 24 of a good conductor such as copper is disposed concentrically within coil 14 with optional flanged terminal portions 26 terminating outwardly of the ends of coil 14. The sleeve 24 may be spaced from and supported by coil 14 using insulated spacers (not shown) or may be supported by standoff insulators (not shown) carried by the walls of housing 10. A longitudinal gap or slit 27 (FIG. 3) extending the length of sleeve 24 is provided to prevent eddy current losses which would result from the "shorted turn" effect of a radially continuous sleeve. The gap 27 is ordinarily oriented in a vertical position to avoid shorting by molten metal as will be apparent hereinafter.

Figure 2:
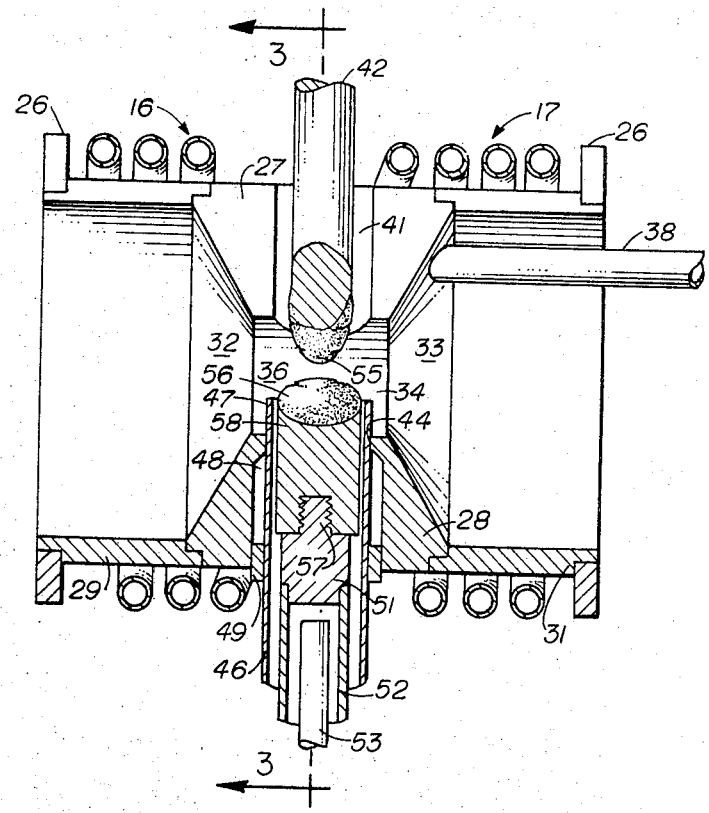
FIGURE 2 is a longitudinal cross sectional view of the apparatus of FIGURE 1 taken along the vertical diametric plane.

It is preferred that the intensifier is provided with constricted medial annular portion 28 as best seen in FIG. 2 and which is conveniently constructed of uniform diameter sleeve portions 29, 31, joined by step cut joints to annular member 28. The side face portions 32, 33 of annular member 28 taper convergently toward the center to terminate in a concentric cylindrical surface 34 defining a constricted opening 36 centrally disposed in sleeve 24. With such a construction the inductive flux produced by coil 14 is concentrated near the axis of said opening defining the aforesaid concentrated heating zone. The ring 28 is divided longitudinally in order that the gap 27 will extend the entire length of the concentrator as stated above. To provide for cooling, member 28 is provided with an internal quasi-annular chamber 37 (shown in FIG. 3) with which inlet and outlet conduits 38 communicate through seals 39 in housing 10 and interiorly parallel to the axis of sleeve portion 31 for the circulation of cooling water from a source (not shown). Sleeve segments 29, 31, are also cooled by the circulating water by conduction to member 28.

Material to be melted is most easily introduced by providing a diametrically aligned bore 41 extending upwardly through member 28 along the medial plane. Various rod, wire or particulate forms of the material can then be dropped or lowered therethrough to enter the concentrated heating zone. For example a solid rod or tube 42 for introducing particles or filled with particulate material can be inserted through a water jacketed sealed slip joint 43 (shown fragmentarily) in the upper wall of housing 10 to pass through bore 41 manually or using mechanical feed means (not shown). Similar sealed chamber means could be used to introduce particulate material.

A preferred arrangement for receiving and supporting the molten material is constructed by providing a downwardly extending bore 44 along the medial plane of member 28 preferably aligned with bore 41. A sleeve 46, e.g., of copper is secured in fluidtight relation in bore 44 with the upper end 47 projecting above surface 34 to approach the concentrated heating zone. Bore 44 includes an enlarged portion 48 communicating with chamber 37 and defining a cooling jacket about sleeve 46. Collar 49 is used to seal bore portion 48. To provide for manipulations required, for example, if castings are to be made a loss fitting pedestal 51, e.g., of the material to be cast is disposed in bore 44 and aligned on cooled pipe jacket 52. (Shown partially) a central tube 53 entering jacket 52 is used to provide cooling water. Pipe jacket 52 slides through seal 54 in wall of housing 10 and coupled to said pedestal 51 can be used to mechanically or manually adjust the height or rotate the pedestal 51 in sleeve 46.

In operation pedestal 51 is first adjusted to a position near the upper end 47 of said sleeve 46 providing what might be termed a movable bottom cold mold or crucible. With requisite radiofrequency power applied to coil 14 on electrically-conductive material 42 is fed into the concentrated heating zone whereupon the lower end 55 of the material melts and drips downwardly forming a molten pool 56 within the upper end of sleeve 46. Due to the effective large cooling capacity of said sleeve the initial material solidifies and attaches to the threaded portion 57 of said pedestal. The rapid cooling also causes deposited material to shrink away from sleeve 46 whereby, by progressive withdrawal, a cast ingot 58 is formed. Care must be taken to withdraw the formed ingot at a rate at which molten pool 56 remains in the concentrated heating zone. Also, if non-uniform heating occurs the ingot is rotated within the sleeve to expose all regions uniformly to the heating effect.

Certain variations can be made in the foregoing. For example, material to be melted can be fed axially through the concentrator especially if a cooled tube is disposed about the rod or wire form to prevent premature melting. At least some deviation can be made from the horizontal orientation of coil and concentrator as long as material to be melted can be introduced and solidified material withdrawn. Also, the watercooled arcuate bottom of constricted ring 28 or of a uniform diameter sleeve concentrator or any similar arcuate, rectangular, etc., configuration sleeve or water-cooled trough disposed in contact with the cooled concentrator can serve as a mold in a similar manner to that above if provision is made to withdraw solidified material longitudinally through said concentrator. Moreover a semicircular or troughlike copper mold in cooling contact with the concentrator sleeve can be used in some cases. Such a mold would occupy the position of the upper end 47 of crucible 46. In general, however, it is generally preferable to employ integrally formed crucible-concentrators of the character described.

The arrangement described in the foregoing is eminently suited for the melting and/or casting of reactive and exotic refractory metals such as titanium, zirconium, hafnium, uranium, thorium, tungsten, rhenium, molybdenum, etc., under either controlled atmospheric conditions, e.g., argon, helium, etc., or at pressures down to the low micron vacuum pressure region, i.e., $10^{-6}$–$10^{-7}$ mm. Hg. Radiofrequency power supplies of about 180 to 500 kilocycle frequency are generally preferred. However, different frequency power supplies can in some cases be used. High pressures and ordinary atmospheres can likewise be used and the process is likewise usable with more common materials, e.g., nickel, chromium, iron, zinc, copper, magnesium and aluminum. Various electrically-conductive materials other than metals such as refractory metal carbides, nitriles, etc., can also be formed and/or melted and/or cast in the device. Moreover, compacts and mechanical mixtures can be fused to form alloys, etc., and cast in the device. The method of casting avoids contamination. Various beneficial effects are provided such as simultaneous purification by volatilization of impurities using low vacuum pressures, homogenization produced by thorough melting and the mixing effects produced by the eddy currents and close control of power input permitting precise control of temperature of charge. Moreover, various impurities will tend to accumulate in the molten pool in a manner somewhat analogous to zone melting-refining procedures; however, volatile materials can more effectively escape since the upper surface of the molten pool is unconfined.

Further details of the invention will be set forth in the following examples:

Example I

An integral crucible intensifier was constructed by slitting an approximately 3" section of ¾ inch copper pipe lengthwise and the section was disposed axially within a 4" glass pipe section fitted as a vacuum chamber disposed within a 6 inch diameter 6 to 8 turn ⅜" diameter copper tubing solenoidal work coil with the slit upward. The intensifier was arranged for water cooling. Chamber was evacuated to about $10^{-4}$ mm. Hg and energy was supplied by a 20 kw. radiofrequency generator operating at about 400 kilocycles. A ¼ inch titanium rod was then fed vertically into the hot zone defined in the concentrator and drip melting occurred with the resulting formation of a pool of about 10 g. of molten titanium and, upon solidification, an ingot of about 1" in length. The length was about equal to the concentrated heating zone.

Example II

Apparatus and conditions similar to that of Example I with the exception that a 6 turn horizontal work coil of about 4½" I.D. was used inside a vacuum enclosure. A split copper intensifier provided with a water cooling jacket was disposed in the work coil with the slit upwards with the arcuate bottom portion of the intensifier sleeve serving as the integral crucible or mold. Nickel, titanium and zirconium were melted and cast therein exemplified as follows: A 46 gram sample of nickel was obtained by quartering an ingot and was melted several times. A resulting button of about 2¼ inches long, ⅝ inch wide and about ⅜ inch thick was obtained. About half the length of the button, corresponding to the length of the hot zone of the intensifier was molten at any one time. A zirconium sample of a short length of ¾" rod melted readily but insufficient power was available to maintain a molten pool and solidification without sticking to the crucible occurred when good contact was established. Similar results were obtained with a 40 g. sample of several chunks of zirconium.

Example III

With an intensifier-crucible of the type described above using a ¾ inch I.D. copper pipe as the vertical crucible and a 6 turn ⅜" copper tubing work coil substantially as in Example II titanium was introduced into the hot zone and melted into the crucible forming an ingot. The upper portion disposed in the hot zone formed a persistent molten pool.

With a scale up to a 1" I.D. crucible, provision for withdrawal and rotation of the ingot and for feeding in rod titanium similar runs were made. A relatively sound ingot 1 inch diameter and 3 inches long was easly formed. In scaling up from ¾" to 1" diameter better ingots were formed and with less difficulty. This is a strong indication that further improvement will be had on further scaleup.

The dimensions of the above device were about as follows:

| | Inches |
|---|---|
| Work coil diameter, I.D. | 4½ |
| Work coil length | 5½ |
| Intensifier length | 6 |
| Intensifier I.D. | 3½ |
| Intensifier O.D. | 4 |
| Medial portion 28 wide (max.) | 2¾ |
| Medial portion 28 wide (min.) | 1½ |
| Opening 36 dia. | 1¼ |

Example IV

Apparatus substantially as in Example III modified to permit introduction of sponge metal forms and using a 1″ diameter crucible. Titanium sponge was fed slowly and no difficulty noted in obtaining satisfactory melting although it was expected that discharges of gaseous materials evolved therefrom would cause difficulty in perhaps shorting the work coil, etc. However, the water-cooled concentrator shielded the coil from spatter evolved by the melting sponge and the experience gained in practice indicated that operation for extended periods can be expected without shorting of the work coil. An ingot of about 1″ diameter and 1¼″ length was formed and which was relatively sound internally and with fair sidewalls. More effective melting and scaleup to larger diameters, especially with the more refractory materials such as zirconium will require power inputs above that of the 20 kw. unit used above.

While there has been described in the foregoing what may be considered to be preferred embodiments of the invention modification can be made therein without departing from the teachings of the invention and it is intended to cover all such as fall within the scope of the appended claims.

What is claimed is:

1. Inductive heating apparatus comprising solenoidal work coil means, a radiofrequency power source adapted to energize said coil means, a conductive sleeve element disposed within said work coil, provided with a longitudinal slit and including a constricted medical portion for concentrating flux from said coil, said medial portion providing an intensified heating zone within said sleeve, cold crucible mold means defined adjacent said heating zone, means for feeding a conductive material to be melted into said heating zone to accumulate in said mold means out of physical and electrical conductive contact across said slit in said conductive sleeve flux concentrator.

2. Apparatus as defined in claim 1 wherein said work coil is arranged in a substantially horizontal position.

3. Apparatus as defined in claim 1 wherein said work coil is arranged in a substantially horizontal position, said conductive sleeve is substantially concentrically disposed in said work coil with said slit in an upwardly oriented position, and said cold crucible-mold means is integrally defined within a lower side portion of said sleeve element.

4. Inductive heating and melting apparatus comprising inductive heating work coil means disposed substantially horizontally, a radiofrequency power source adapted to energize said coil means, a flux concentrator sleeve element disposed in said work coil, said element defining a longitudinal slit disposed in a substantially vertical orientation and including a constricted medial portion, said medial portion providing an intensified heating zone in said sleeve element, and means for introducing a conductive material into said heating zone to be melted, cold crucible means defined in said medial portion of said sleeve element in a position for receiving said melted material and retaining same out of contact with said slit.

5. Apparatus as defined in claim 4 wherein said flux concentrator sleeve element includes a medial plane water cooled constricted portion, and said cold crucible means is defined in the lower side of said constricted portion.

6. Inductive heating and melting apparatus comprising solenoidal work coil means adapted for connection to a radio-frequency power source, said coil being disposed substantially horizontally, a flux concentrator sleeve element including a water cooled constricted medial portion, a slit extending longitudinally therealong and oriented upwardly and a bore extending upwardly in the medial portion, said medial portion defining an intensified heating zone, means for introducing a material to be melted in said intensified heating zone through said bore in the medial portion, and cold crucible means defined in the lower internal side portion of said medial sleeve portion for receiving said melted material and maintaining at least the upper portion thereof in said intensified heating zone.

7. Apparatus as defined in claim 6 wherein said cold crucible means comprises a sleeve vertically disposed in a bore in the lower medial portion of said sleeve element and movable bottom means disposed in said sleeve.

8. Inductive heating and melting apparatus comprising a housing defining a closed chamber and arranged for coupling to evacuating and controlled atmosphere gas supply means, inductive heating and melting apparatus comprising solenoidal work coil means adapted to be disposed in said chamber for connection to a radiofrequency power source, said coil being disposed substantially horizontally, a flux concentrator sleeve element including a water-cooled constricted medial portion, a slit extending longitudinally therealong and oriented upwardly and a bore extending upwardly in the medial portion, said medial portion defining an intensified heating zone, means for introducing a material to be melted in said intensified heating zone through said bore in the medial portion, and cold crucible means defined in the lower internal side portion of said medial sleeve portion for receiving said melted material and maintaining at least the upper portion thereof in said intensified heating zone.

9. Apparatus as defined in claim 8 wherein said cold crucible means comprises a sleeve vertically disposed in a bore in the lower medial portion of said sleeve element and movable bottom means disposed in said sleeve.

References Cited

UNITED STATES PATENTS

| | | | |
|---|---|---|---|
| 2,922,710 | 1/1960 | Dombrowski et al. | 75—84 |
| 3,108,325 | 10/1963 | Harvey et al. | 219—10.79 X |
| 3,251,655 | 5/1966 | Bennett | 219—10.79 X |

RICHARD M. WOOD, *Primary Examiner.*

L. H. BENDER, *Assistant Examiner.*